No. 647,092. Patented Apr. 10, 1900.
J. M. HAWKINS.
HARVESTER AND BINDER.
(Application filed Sept. 25, 1899.)
(No Model.)

Witnesses
Edward J Collins
[signature]

Inventor
Jonathan M Hawkins
P. Samuel [signature]
Attorney

THE NORRIS PETERS CO., PHOTO-LITHO., WASHINGTON, D. C.

United States Patent Office.

JONATHAN M. HAWKINS, OF MONTGOMERY, NEW YORK.

HARVESTER AND BINDER.

SPECIFICATION forming part of Letters Patent No. 647,092, dated April 10, 1900.

Application filed September 25, 1899. Serial No. 731,574. (No model.)

*To all whom it may concern:*

Be it known that I, JONATHAN M. HAWKINS, a citizen of the United States, residing at the town of Montgomery, in the county of Orange and State of New York, have invented certain new and useful Improvements in Harvesters and Binders; and I do hereby declare the following to be a full, clear, and exact description of the invention, such as will enable others skilled in the art to which it appertains to make and use the same.

My invention relates more particularly to harvesters and binders in which the grain is conveyed from the platform to the binding mechanism by means of carrier-belts operated by rollers, and has for its object to provide a simple device which will effectually prevent straw and other foreign substances from getting between the frame and the ends of the rollers.

Heretofore considerable inconvenience has been experienced in working harvesters and binders, particularly in damp grain, by reason of straws getting entangled between the frame and the ends of the rollers, where they would continue to accumulate and could only be removed by stopping the machine and removing the carrier-belts. The friction produced by these accumulations frequently ignited the ends of the rollers and the frames to the great damage of the machine.

My invention will be understood by reference to the accompanying drawings, wherein the same parts are designated by the same letters throughout the several views.

Figure 1:
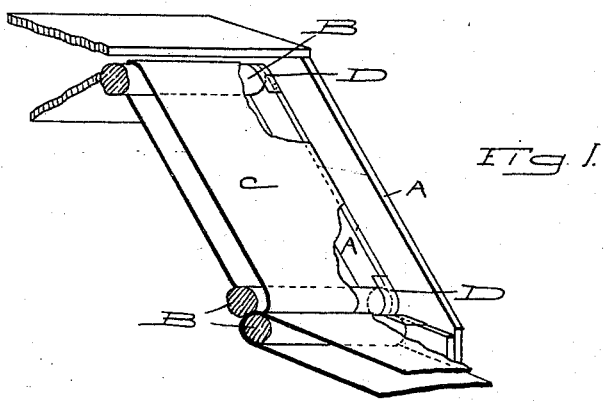
Figure 2:
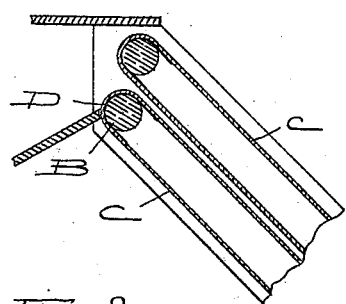
Figure 3:
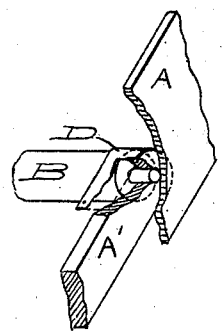

Figure 1 is a perspective view of a portion of the elevator-frame and platform of a harvester and binder, showing the lower elevator and platform carrier-belts partly broken away, also the application of my improved shield or guard. Fig. 2 is a transverse section through the upper rollers. Fig. 3 is a view in perspective of the end of one of the rollers, showing the frame partly broken away.

A represents the frame of the elevator, to the inner side of which is attached the cleat A', which is equal in width to the diameter of the rollers B B. The carrier-belts C C are driven by the rollers in the usual manner and in the direction shown by the arrows. The flexible shield D is attached to the cleat A' of the frame A by means of either screws or nails and overlaps the end of the rollers D D, as shown in Figs. 1 and 3. It is only necessary to fasten one end of the flexible shield D to the cleat A', as the pressure of the carrier-belt upon it holds it in position over the cleat and end of the roller, as shown in Fig. 2.

A separate shield or guard is used to protect each end of the rollers and can be used on one or all of them.

My improved shield or guard can be attached to either new or old machines, as its application does not necessitate a change of construction or form of either roller or frame.

Having thus described my invention, what I claim, and desire to secure by Letters Patent, is—

In combination with a harvester and binder, an elevator-frame, a cleat attached thereto and supporting a carrier-roller, a carrier-belt, a fixed flexible shield or guard located between the said carrier-belt and its supporting-roller, one end being attached to the cleat and overlapping the end of the roller and the end of the cleat on the inner side of the frame, all substantially as described.

In testimony whereof I affix my signature in presence of two witnesses.

JONATHAN M. HAWKINS.

Witnesses:
EDWARD J. COLLINS,
HARRY L. WELLS.